United States Patent
Biagini et al.

(10) Patent No.: US 9,587,574 B2
(45) Date of Patent: Mar. 7, 2017

(54) EXHAUST SYSTEM USING ASH-COMPENSATING REGENERATION MANAGEMENT

(71) Applicant: Electro-Motive Diesel, Inc., LaGrange, IL (US)

(72) Inventors: Douglas Michael Biagini, Washington, IL (US); Rajesh Narayanan Nair, Mossville, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 272 days.

(21) Appl. No.: 14/555,351

(22) Filed: Nov. 26, 2014

(65) Prior Publication Data

US 2016/0146077 A1    May 26, 2016

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F02D 41/02* | (2006.01) |

(52) U.S. Cl.
CPC ....... *F02D 41/029* (2013.01); *F02D 41/0245* (2013.01); *F02D 2041/026* (2013.01); *F02D 2200/0812* (2013.01); *F02D 2200/604* (2013.01)

(58) Field of Classification Search
CPC .. F01N 3/2066; F02D 41/029; F02D 41/0245; F02D 2041/026; F02D 2200/0812; F02D 2200/604

USPC .................................. 60/295, 297, 274, 311
See application file for complete search history.

(56) References Cited

U.S. PATENT DOCUMENTS

| | | | |
|---|---|---|---|
| 6,829,890 B2 | 12/2004 | Gui et al. | |
| 7,299,626 B2 | 11/2007 | Barasa et al. | |
| 7,343,738 B2 | 3/2008 | Tsutsumoto et al. | |
| 2008/0295491 A1* | 12/2008 | Kuboshima | F01M 1/18 60/285 |
| 2010/0011750 A1* | 1/2010 | Onodera | B01D 46/0061 60/287 |

(Continued)

*Primary Examiner* — Audrey K Bradley
*Assistant Examiner* — Dapinder Singh
(74) *Attorney, Agent, or Firm* — Finnegan, Henderson, Farabow, Garrett & Dunner, LLP (57) ABSTRACT

An exhaust system for an engine having a throttle is disclosed. The exhaust system may include an exhaust passage connectable to the engine, a particulate filter disposed in the exhaust passage, a sensor configured to generate a signal indicative of a total pressure differential across the particulate filter caused by soot and ash accumulation, a load actuator configured to selectively adjust a load on the engine, and a control module electronically connected to the load actuator and the sensor. The control module may be configured to determine a compensated pressure differential indicative of an amount of the total pressure differential caused by soot accumulation, a soot load of the particulate filter based on the compensated pressure differential, cause the load actuator to initiate a first engine load increase based on the soot load, track a time elapsed since initiation of the first engine load increase, and cause the load actuator to initiate a subsequent engine load increase when the time elapsed is greater than an elapsed time limit and the soot load is greater than a target soot load.

18 Claims, 4 Drawing Sheets

(56) References Cited

U.S. PATENT DOCUMENTS

2012/0053814 A1\* 3/2012 George .............. F01N 3/0231
  701/102
2013/0046424 A1 2/2013 Gallagher et al.

\* cited by examiner

EXHAUST SYSTEM USING ASH-COMPENSATING REGENERATION MANAGEMENT

TECHNICAL FIELD

The present disclosure is directed to an exhaust system and, more particularly, to an exhaust system using a regeneration management process.

BACKGROUND

Engines, including diesel engines, gasoline engines, gaseous fuel powered engines, and other engines known in the art exhaust a complex mixture of air pollutants. These air pollutants can include gaseous compounds, such as the oxides of nitrogen, and solid material known as particulate matter or soot. Particulate matter is commonly removed from engine exhaust streams using a device known as a particulate filter. Particulate filters typically include a porous filtration medium that traps particulate matter and permits other exhaust gas constituents to flow through. After a period of time, particulate filters become clogged with particulate matter, which must be removed in order for the particulate filter to continue functioning properly. The process of removing particulate matter from a particulate filter is known as regeneration. Particulate filter regeneration methods commonly include steps of detecting when a particulate filter has reached a maximum capacity, artificially raising an exhaust temperature to a high enough temperature to combust particulate matter, and maintaining that temperature until a sufficient amount of particulate matter has been burned away.

Known methods for detecting when a particulate filter has reached maximum capacity have included calculating a particulate load of the particulate filter using various inputs, including a pressure differential across the particulate filter, particulate filter temperature, time spent at various throttle notch settings, time spent at idle, and time since a previous regeneration. Also, known methods of achieving and maintaining regeneration temperatures have included increasing throttle notch settings for predetermined periods of time. However, these methods may not be optimum.

An exemplary exhaust system that artificially raises the temperature of exhaust passing through a filter is disclosed in U.S. Patent Publication 2013/0046424 of Gallagher et al. that published on Feb. 21, 2013 ("The '424 publication"). Specifically, the '424 publication discloses a locomotive having a diesel engine connected to an exhaust system that includes a particulate filter. A locomotive controller communicates with the engine, a throttle, and a consist controller. The locomotive controller receives signals from various engine sensors to determine when to regenerate the particulate filter. The locomotive controller and consist controller adjust load distributions among locomotives in the consist to generate higher exhaust temperatures for assisting regeneration. Throttle notch settings are adjusted in each locomotive to assist regeneration of a particular locomotive's particulate filter. Regeneration is determined to be complete based on sensor data or after a certain amount of time has passed, such as 30 minutes.

Although the system of the '424 publication may adequately regenerate an exhaust particular filter, it may still be less than optimal. Specifically, the system may not consider important operating conditions of the diesel engine and exhaust system prior to and/or during regeneration that could improve an efficiency of the regeneration process. Particularly, the system may not account for ash content separately from soot content within the particulate filter, which may lead to inaccurate triggering and/or termination of regeneration. Further, throttle notch settings may not be effectively managed to improved efficiency and reduce damage to the particulate filter during the regeneration process.

The disclosed exhaust system addresses one or more of the problems discussed above and/or other problems of the prior art.

SUMMARY

In one aspect, the present disclosure is directed to an exhaust system for an engine having a throttle. The exhaust system may include an exhaust passage connectable to the engine and a particulate filter disposed in the exhaust passage. The exhaust system may further include a sensor configured to generate a signal indicative of a total pressure differential across the particulate filter caused by soot and ash accumulation. The exhaust system may further include a load actuator configured to selectively adjust a load on the engine and a control module electronically connected to the load actuator and the sensor. The control module may be configured to determine a compensated pressure differential indicative of an amount of the total pressure differential caused by soot accumulation, a soot load of the particulate filter based on the compensated pressure differential, and cause the load actuator to initiate a first engine load increase based on the soot load. The control module may be further configure to track a time elapsed since initiation of the first engine load increase and cause the load actuator to initiate a subsequent engine load increase when the time elapsed is greater than an elapsed time limit and the soot load is greater than a target soot load.

In another aspect, the present disclosure is directed to a method of regenerating a particulate filter in an exhaust system of an engine. The method may include determining a total pressure differential across the particulate filter caused by soot and ash accumulation and determining a compensated pressure differential indicative of an amount of the total pressure differential caused by soot accumulation. The method may further include determining a soot load of the particulate filter based on the compensated pressure differential, requesting an operator selection of manual or automatic regeneration of the particulate filter, and selectively initiating a first incremental engine load increase according to the operator selection. The method may further include tracking a time elapsed since initiation of the first incremental engine load increase, comparing the soot load of the particulate filter to a first target soot load, and selectively initiating a subsequent incremental engine load increase when the time elapsed is greater than an elapsed time limit and the soot load is greater than a target soot load.

In another aspect, the present disclosure is directed to a locomotive. The locomotive may include an engine having a throttle, an operator station having a console and a throttle selector connected to the throttle, a particulate filter fluidly connected to receive exhaust from the engine, a sensor configured to generate a signal indicative of a total pressure differential across the particulate filter caused by soot and ash, a load actuator configured to selectively adjust a load on the engine, and a control module electronically connected to the load actuator and the sensor. The control module may be configured to determine a compensated pressure differential indicative of an amount of the total pressure differential caused by soot accumulation, determine an idle time-based soot load of the particulate filter when the compensated pressure differential is below a threshold, determine a mass flow-based soot load of the particulate filter when the compensated pressure differential is equal to or greater than the threshold, and determine a final soot load based on one of the idle time-based soot load and the mass flow-based soot load. The control module may be further configured to cause the load actuator to initiate a first incremental engine load increase based on one of the idle time-based soot load and the mass flow-based soot load, track a time elapsed since initiation of the first incremental engine load increase and compare the final soot load to a first target soot load, and cause the load actuator to initiate a subsequent engine load increase when the time elapsed is greater than elapsed time limit and the final soot load is greater than a target soot load.

DETAILED DESCRIPTION

Figure 1:
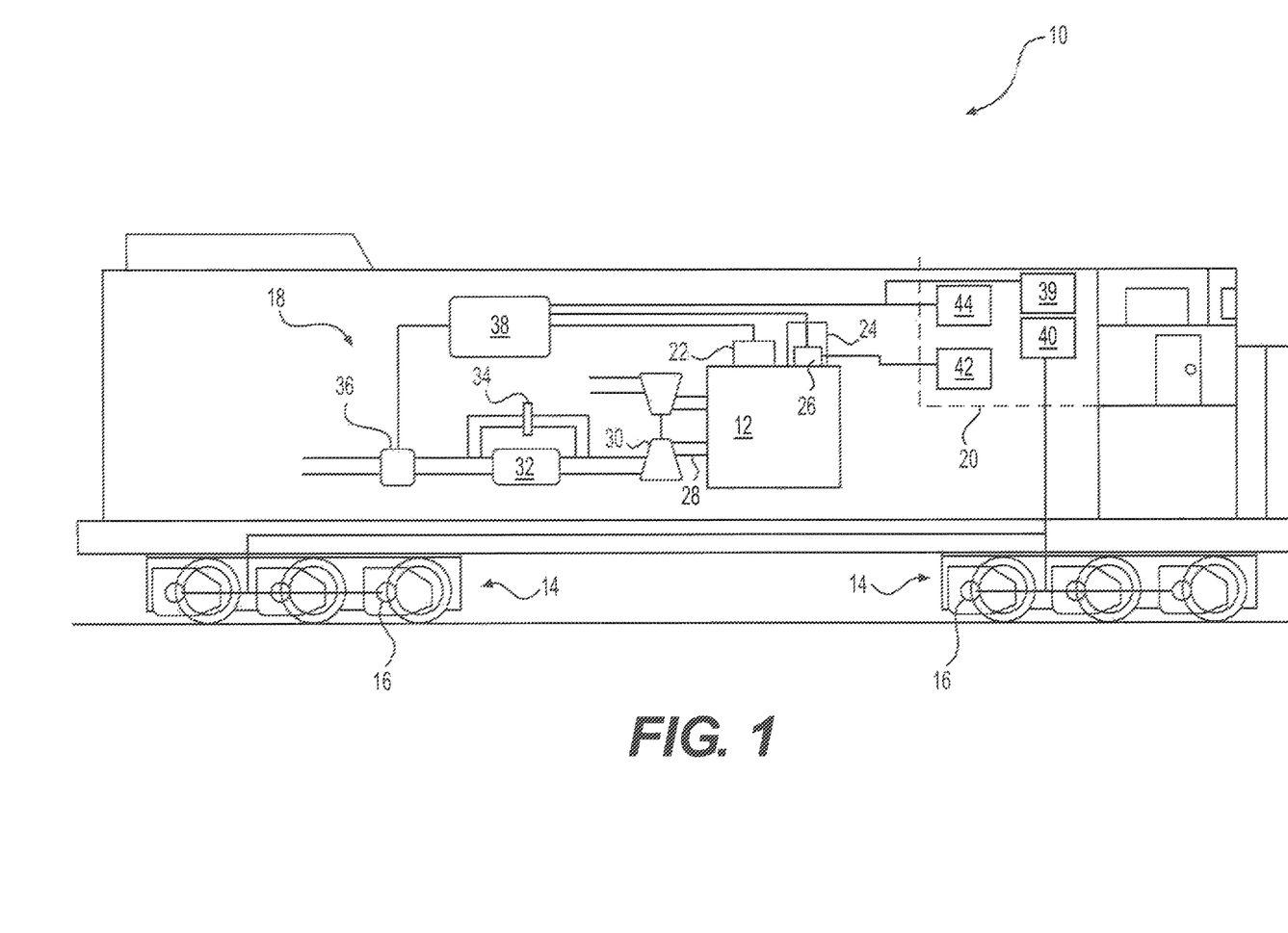
FIG. 1 is a diagrammatic illustration of a machine incorporating an exemplary disclosed exhaust system.

FIG. 1 illustrates an exemplary power system 10. For the purposes of this disclosure, power system 10 is depicted and described as a mobile machine, for example a locomotive. Power system 10 may include, among other things, one or more multi-cylinder internal combustion engines 12, traction devices 14 driven by engine 12, and brakes 16 connected to traction devices 14. Each engine 12 may be configured to combust a mixture of air and fuel, for example diesel, gasoline, or a gaseous fuel, to generate a mechanical output that drives traction devices 14. Brakes 16 may be configured to selectively engage traction devices 14 in order to slow the mobile machine. Power system 10 may also include an exhaust system 18 configured to receive combustion products from engine 12, and an operator station 20 for manual control of engine 12 and exhaust system 18.

Engine 12 may include plurality of sensors 22 and one or more load actuators 24. Sensors 22 may be configured to generate signals relating to various operating parameters, such as engine speed, load, fuel flow rate, boost pressure, intake air flow rate, temperature, and hours of operation. Load actuators 24 may include a throttle 26, fuel injectors (not shown), valves (not shown), or other types of actuators configured to increase a load on engine 12. Throttle 26 may be a notch throttle being movable between a number of discrete notch settings (e.g. eight notches $TN_1$-$TN_8$ and an idle notch $TN_{idle}$), each corresponding to a different desired power output from engine 12.

Exhaust system 18 may have components that cooperate with engine 12 to promote the production of power and to simultaneously control the emission of pollutants to the atmosphere. For example, exhaust system 18 may include one or more exhaust passages 28 fluidly connected to the cylinders of engine 12, one or more turbochargers 30 driven by exhaust flowing through exhaust passages 28, a diesel particulate filter (DPF) 32 fluidly connected to receive and treat exhaust from turbochargers 30, a pressure sensor 34 associated with DPF 32, and a load actuator 36, such as an exhaust restrictor valve 37, fluidly connected to pass and adjustably impede a flow of treated exhaust from DPF 32 to the atmosphere. As the hot exhaust gases exiting the cylinders of engine 12 move through turbochargers 30 and expand against vanes (not shown) thereof, turbochargers 30 may be driven to pressurize combustion air drawn into engine 12. DPF 32 may trap particulate matter, such as soot, in the exhaust exiting turbochargers 30. Pressure sensor 34 may be configured to generate a pressure signal indicative of a total differential pressure across DPF 32 that is caused by soot and ash accumulations in DPF 32. Load actuator 36 is depicted and described herein as an exhaust restrictor valve that may be adjusted to impede a flow of exhaust leaving DPF 32, thereby increasing a load on engine 12, which in turn increases a temperature within DPF 32 to a level at which accumulated soot can burn away. It is contemplated that load actuator 36 may include one or more load actuators of various types configured to impede the flow of exhaust or otherwise increasing the load on engine 12.

Exhaust system 18 may further include a control module 38 electronically connected to pressure sensor 34, sensors 22, and load actuators 24, 36. Control module 38 may be configured to receive the pressure signal from pressure sensor 34 and determine a total pressure differential $\Delta P$ across DPF 32, and also a compensated pressure signal $\Delta P_C$ based on the total pressure differential $\Delta P$ and signals from sensors 22. Based on the total pressure differential $\Delta P$ and the compensated pressure signal $\Delta P_C$, control module 38 may determine a raw soot load $\theta_R$ and a final soot load $\theta_F$ within DPF 32. Based on the raw soot load $\theta_R$, control module 38 may determine when to regenerate DPF 32 by selectively incrementally increasing a load on engine 12 according a regeneration management process stored within control module 38. Control module 38 may be configured to track elapsed time after incremental load increases.

Control module 38 may be configured to show instructions to an operator via a display 39 located in operator station 20. The instructions may request an operator selection of one or more load actuators 24 and 36 for use in increasing the engine load. The instructions may also request an operator selection of manual or automatic control over the load actuators 24 and 36. If automatic control is selected, control module 38 may automatically adjust load actuators 24 and/or 36 according to the regeneration management process to selectively increase a load on engine 12. In some embodiments, control module 38 may perform automatic control without operator interaction. In other embodiments, control module 38 may perform automatic control based on certain operator inputs. If manual control is selected, control module 38 may show alerts and instructions to the operator via display 39 to manually adjust one or more of the load actuators 24 and 36 to increase the load on engine 12.

Control module 38 may store models, algorithms, maps, and lookup tables for determining and/or predicting exhaust system operating parameters, such as temperatures, pressures, and soot loads. For example, control module 38 may be configured to determine a total exhaust flow rate through exhaust system 18, an average load factor since a previous DPF replacement, and a number of engine hours since a previous DPF replacement. It should be appreciated that control module 38 may include a memory, a secondary storage device, a processor, and any other components for running an application. Control module 38 may include a number of modules that may include a processor, memory, and other components for running applications. Various other circuits may be associated with control module 38, such as power supply circuitry, signal conditioning circuitry, actuator driver circuitry, and other types of circuitry.

Operator station 20 may be configured to receive input from an operator relating to operations of engine 12 and exhaust system 18. Operator station 20 may include a brake actuator 40 connected to brakes 16, a throttle selector 42 connected to throttle 26, a display 39 electronically connected to control module 38, and a console 44 electronically connected to control module 38. Display 39 may receive alerts and instructions from control module 38 and show them to the operator. The alerts and instructions may instruct the operator to apply and release brakes 16 via brake actuator 40 at the beginning and end of a regeneration event. It is contemplated that different input devices may alternatively or additionally be included within operator station 20 such as, for example, wheels, knobs, push-pull devices, switches, pedals, and other operator input devices known in the art.

Exemplary regeneration determination and regeneration management processes that may be performed with exhaust system 18 will be discussed below with regard to FIGS. 2-4.

INDUSTRIAL APPLICABILITY

The disclosed exhaust aftertreatment system may be used in any machine or power system application having a particulate filter, where it is beneficial to reduce the likelihood of damaging the particulate filter during regeneration. The disclosed exhaust system process finds particular applicability within mobile machines, such as locomotives, having particulate filters which can be subjected to high-temperature regeneration processes. Operations of exemplary exhaust system 18 will now be described in detail.

During operation of power system 10, engine 12 may combust a mixture of air and fuel, thereby generating a flow of exhaust gases and a mechanical output for driving traction devices 14. The exhaust gases may be guided from engine 12 into exhaust system 18 via exhaust passages 28. As the exhaust gases travel though exhaust passages 28 and expand against vanes (not shown) of turbochargers 30, the gasses may drive the pressurization of combustion air drawn into engine 12. DPF 32 may trap particulate matter, such as soot, in the exhaust exiting turbochargers 30.

Over time, soot may accumulate in DPF 32, which may require regeneration to continue functioning properly. Pressure sensor 34 may generate a signal indicative of a pressure differential across DPF 32 and communicate the signal to a control module 38 as the soot accumulates. Control module 38 may use the signal from pressure sensor 34 and other signals from sensors 22 to determine when to regenerate DPF 32 in order to reduce an amount of soot trapped therein.

Figure 2:
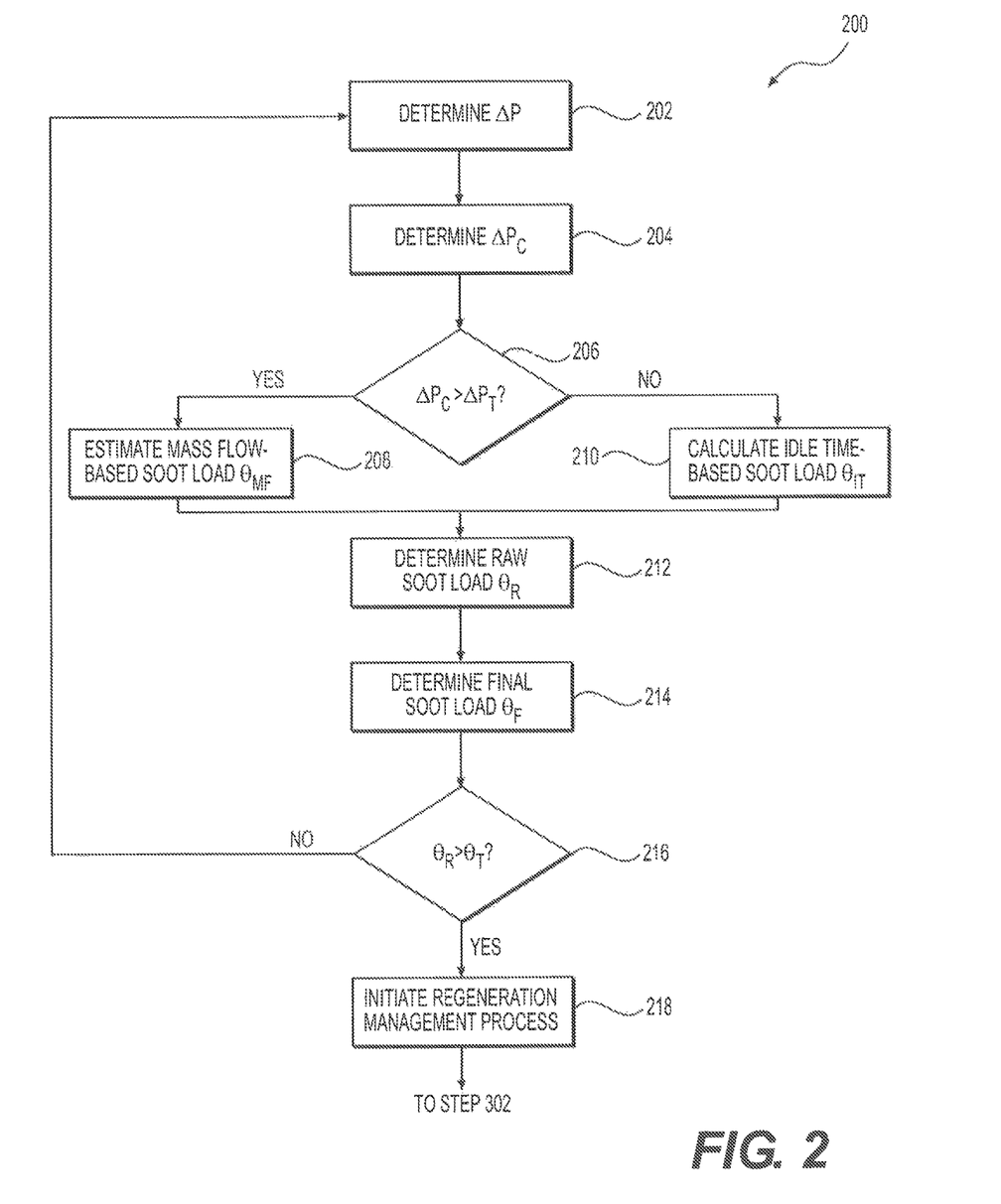
FIG. 2 is a flow chart of an exemplary disclosed regeneration determination process that may be carried out by the exhaust system of FIG. 1.

FIG. 2 shows an exemplary regeneration determination process 200 that may be performed by exhaust system 18. Control module 38 may determine a total pressure differential ΔP across DPF 32 based on the pressure signal from pressure sensor 34 (Step 202). However, the total pressure differential ΔP may not distinguish between an accumulation of soot and an accumulation of ash, which is a byproduct of burning soot during regeneration, that cause total pressure differential ΔP to increase. Since ash may not be entirely removed during subsequent regeneration events, regeneration events aiming to reduce a total pressure differential ΔP may be unnecessarily prolonged, thereby wasting fuel and time.

To compensate for ash buildup in DPF 32, control module 38 may determine a compensated pressure differential $\Delta P_C$ indicative of an amount of the total pressure differential ΔP caused by soot accumulation (Step 204). The compensated pressure differential $\Delta P_C$ may be determined based on the total pressure differential ΔP and other parameters, such as a total exhaust flow through exhaust system 18, an average load factor $L_F$ since a previous DPF replacement, and a number of engine hours since a previous DPF replacement. For example, the load factor may be determined using a map that correlates operating parameters such as, for example, engine speed, torque, and fuel consumption, to an amount of ash accumulation per hour since a previous DPF replacement. The load factor times the number of hours since a previous DPF replacement may represent an expected ash load pressure differential $\Delta P_A$ caused by ash in DPF 32, which is subtracted from the total pressure differential ΔP to arrive at the compensated pressure differential $\Delta P_C$ via EQ. 1 below:

$$\Delta P_C = \Delta P - \Delta P_A \qquad \text{EQ. 1}$$

Control module 38 may compare the compensated pressure differential $\Delta P_C$ to a minimum threshold $\Delta P_T$ indicative of an idle state (Step 206). An idle state may be a condition in which a pressure drop across DPF 32 is low due to a low total exhaust flow rate. During an idle state, the raw soot load $\theta_R$ may not be accurately determined based on ΔP. Thus, based on the comparison of step 206, control module 38 may selectively determine one of a mass flow-based soot load $\theta_{MF}$ and an idle time-based soot load $\theta_{IT}$.

For example, when $\Delta P_C$ is equal to or greater than the minimum threshold $\Delta P_T$ at step 206, a mass flow-based soot load $\theta_{MF}$ may be determined using the total exhaust flow rate, the compensated pressure differential $\Delta P_C$, and a map or lookup table correlating the compensated pressure differential $\Delta P_C$ to the mass flow-based soot load $\theta_{MF}$ (Step 208). However, when $\Delta P_C$ is less than the minimum threshold $\Delta P_T$, control module 38 may instead determine an idle time based soot load $\theta_{IT}$ (Step 210). Idle time-based soot load $\theta_{IT}$ may be calculated based on a number of hours that engine 12 has run and an idle soot load rate (i.e. % soot load per hour). An idle soot load rate may be determined based on a minimum idle soot load rate as a function operating parameters such as, for example, engine speed and fuel consumption. A minimum idle soot load rate may be determined using a map, algorithm or model stored in control module 38.

Accordingly, when $\Delta P_C$ is equal to or greater than the minimum threshold $\Delta P_T$ and the mass flow-based soot load $\theta_{MF}$ has been determined, the raw soot load $\theta_R$ may then be determined as equal to the mass flow-based soot load (Step 212). However, when $\Delta P_C$ is less than the minimum threshold $\Delta P_T$ and the idle time-based soot load $\theta_{IT}$ has been determined, the raw soot load $\theta_R$ may then be determined as equal to the idle time-based soot load in step 212.

Control module 38 may determine the final soot load $\theta_F$ by filtering continuous determinations of the raw soot load $\theta_R$ to remove outlier values (Step 214). The final soot load $\theta_F$ may be continually determined by control module 38 to indicate the current soot load of DPF 32 even when a regeneration determination is not taking place. For example, the final soot load $\theta_F$ may he utilized during regeneration of DPF 32 to indicate a current soot load that may be compared to target soot load (e.g. a reduced soot load) of the regeneration process.

Control module 38 may then determine whether to regenerate DPF based on the raw soot load $\theta_R$ (Step 215). If the raw soot load $\theta_R$ is below a predetermined threshold $\theta_T$, control module 38 may return to step 202. However, if the final soot load $\theta_R$ is above the predetermined threshold $\theta_T$, control module 38 may initiate a regeneration management process (Step 218).

Figure 3:
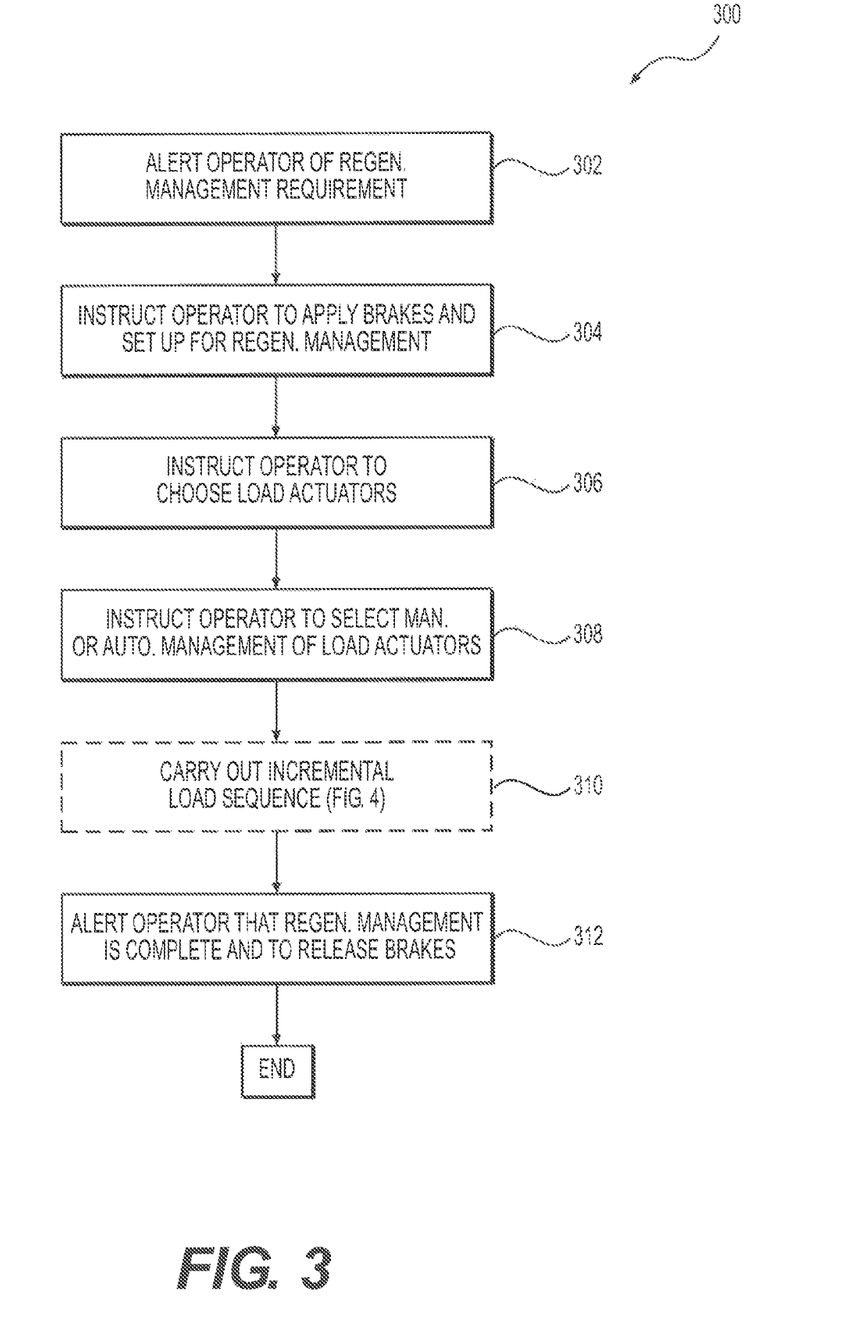
FIG. 3 is a flow chart of an exemplary disclosed regeneration management process that may carried out by exhaust system of FIG. 1.

FIG. 3 shows an exemplary regeneration management process 300 that may be initiated based on determination process 200 of FIG. 2. To properly coordinate shared control of exhaust system 18 between the operator and control module 38, certain aspects of regeneration management may be manually governed by the operator, shared by the operator and control module 38, or automatically controlled by control module 38. Accordingly, control module 38 may begin regeneration management process 300 by alerting the operator via display 39 that regeneration management is required (Step 302). To ensure that control of process 300 is properly coordinated between control module 38 and the operator, control module 38 may instruct the operator to acknowledge the alert, for example, by pressing an acknowledgement button on console 44 before proceeding to the next step.

Regeneration may be performed while power system is moving or while it is stationary, it desired. In one exemplary embodiment, regeneration is performed when power system 10 is stationary. To prevent power system 10 from moving during the regeneration management process, control module 38 may instruct the operator via display 39 to apply brakes 16 and set up power system 10 for the regeneration management process (Step 304). Upon completion, the operator may indicate readiness to continue, for example, by pressing the same or another button on console 44.

Control module 38 may then instruct the operator via display 39 to choose one or more load actuators, such as throttle 26 and exhaust restrictor valve 37, to manage during process 300 (Step 306). Once at least one load actuator is selected, control module 38 may instruct the operator via console 44 to select a manual or automatic actuation mode for the load actuators (Step 308). During manual operation, throttle notch settings $TN_1$-$TN_8$ may be manually selected by the operator via throttle selector 42, and exhaust restrictor valve positions $ERV_1$-$ERV_8$ may be selected via console 44. During automatic actuation, the throttle settings and exhaust restrictor valve positions may be automatically selected by control module 38.

In manual and automatic modes, the load actuators may be adjusted according to an incremental load sequence stored within control module 38 in order to gradually place a greater load on engine 12 and thereby slowly increase a temperature of DPF 32 (Step 310). Depending on operator input received during step 308, control module 38 may automatically make incremental adjustments to the load actuators or instruct the operator when to manually make incremental adjustments during step 310. The incremental load sequence stored within control module 38 may be used to raise the temperature within DPF 32 to a sufficient temperature for burning away soot trapped therein without damaging DPF 32 by initiating a number of incremental load increases. Following the incremental load sequence in step 310, control module 38 may alert the operator via display 39 that the regeneration management process is complete and instruct the operator to release brakes 16 if they were applied in step 304 (Step 312).

Figure 4:
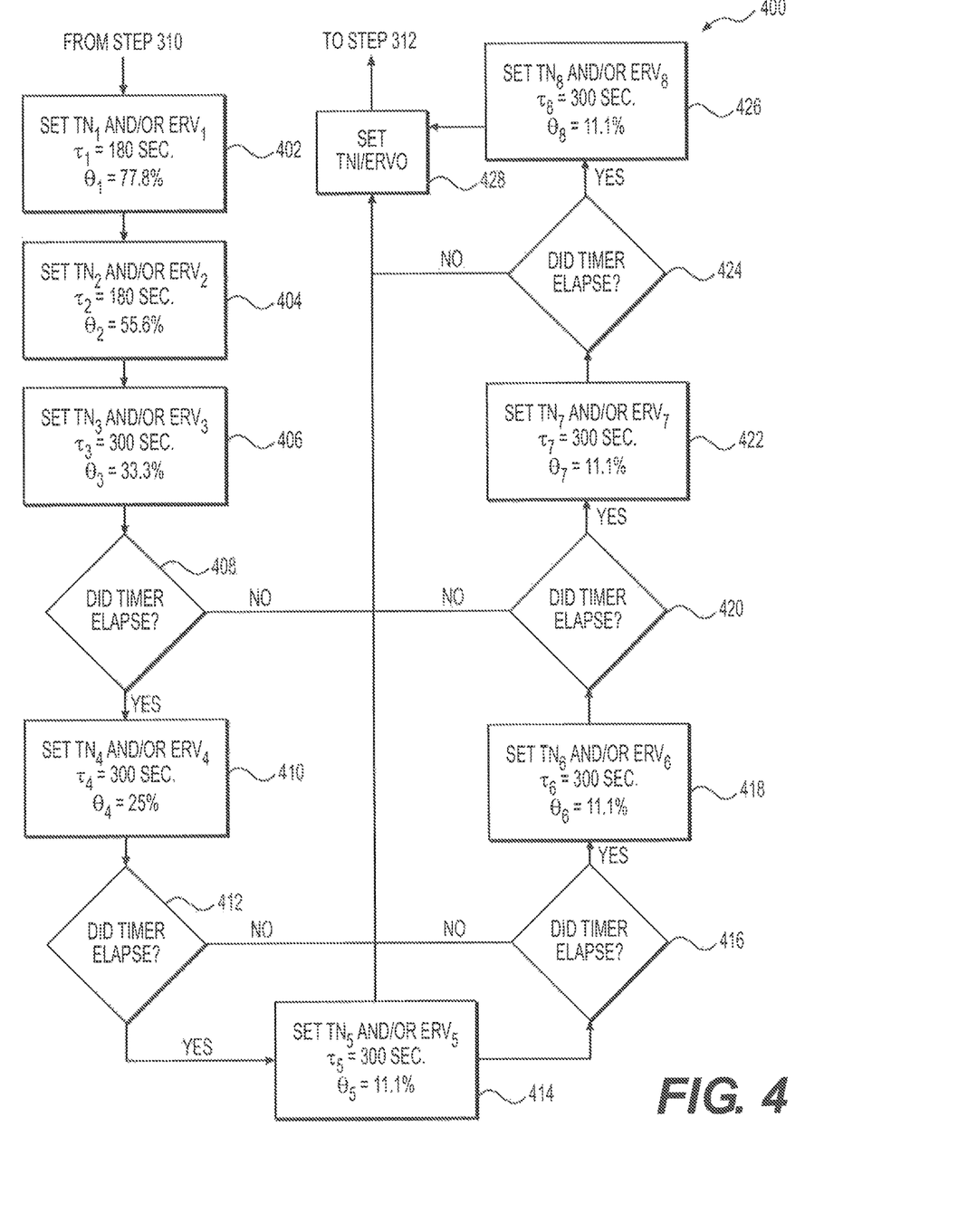
FIG. 4 is a flow chart of an exemplary disclosed incremental load sequence that may be included in the regeneration management process of FIG. 3.

FIG. 4 shows an exemplary incremental load sequence 400 that may be included in step 312 of regeneration management process 300. As described above, the load on engine 12 may be incrementally increased in order to raise the temperature within DPF 32 to a suitable regeneration temperature for burning away soot without damaging DPF 32. Each incremental load increase may correspond to a throttle notch setting $TN_1$-$TN_8$ and/or an exhaust restrictor valve position $ERV_1$-$ERV_8$ that is indicative of a load experienced by engine 12. Each incremental load increase may further correspond to a target soot load $\theta$ and an elapsed time limit $\tau$ since initiation of the incremental load increase. Target soot load $\theta$ may correspond to a remaining soot load desired to be reached by a certain elapsed time limit $\tau$. Control module 38 may determine that target soot load $\theta$ has been achieved by comparing a current final soot load $\theta_F$ to the target soot load $\theta$. The target soot load $\theta$ may be a percent of an effective soot capacity of DPF 32. For example, control module 38 may store or be configured to determine an absolute soot capacity of DPF 32 and, based on the absolute soot capacity, determine an effective soot capacity, which may be lower than the absolute soot capacity of DPF 32. An effective soot capacity may be determined such that if DPF 32 is at 100% of the effective soot capacity, DPF 32 may be at less than 100% of the absolute soot capacity. In this way, reaching an absolute soot capacity of DPF 32 may be avoided in situations where DPF regeneration cannot be effectively carried out and must be delayed. The target soot load $\theta$ may be a percent of the effective soot capacity (i.e., 77.8%, 55.6%, 33.3%, 25%, 11.1%). Target soot load (i.e., $\theta_1$-$\theta_8$) may be any suitable soot load achievable at a corresponding throttle notch setting and/or exhaust restrictor valve position.

The elapsed time limit $\tau$ may correspond to an amount of elapsed time after each incremental load increase and that is tracked by control module 38. The elapsed time limit (i.e., $\tau_1$-$\tau_8$) may relate to a target soot load $\theta$. The elapsed time limit $\tau$ may be the same or a different amount of time for each incremental load increase and may range from about 60-600 seconds (e.g., about 180 or 300 seconds). It is contemplated, however, that the elapsed time limit $\tau$ may be any suitable time limit that reduces a possibility of overheating DPF 32 by rapidly initiating successively higher load increases. As used herein, an elapsed time limit is "achieved" when the elapsed time since the initiation of a first or subsequent incremental load increase is greater than or equal to the elapsed time limit $\tau$.

As seen in FIG. 4, control module 38 may initiate a first incremental load increase associated with a first throttle notch setting $TN_1$ and/or a first exhaust restrictor valve position $ERV_1$ (Step 402). Depending on the operator selection made at step 310 (referring to FIG. 3), control module 38 may instruct the operator to select $TN_1$ via throttle selector 42 and/or $ERV_1$ via console 44. Alternatively, control module 38 may automatically adjust throttle 26 and/or exhaust restrictor valve 37 to $TN_1$ and/or $ERV_1$, respectively. In the automatic mode, control module 38 may notify the operator of the change and request acknowledgment via display 39. The first incremental load increase may also be associated with a first target soot load $\theta_1$ and a first elapsed time limit $\tau_1$. For example, $\theta_1$ may range from about 85-65% of an effective soot load (e.g., 77.8%) and $\tau_1$ may range from 120-240 seconds (e.g., 180 seconds). If either $\theta_1$ or $\tau_1$ is achieved, control module 38 may proceed to the next step.

Control module 38 may instruct the operator via display 39 to select $TN_2$ via throttle selector 42 and/or $ERV_2$ via console 44 (Step 404). Alternatively, control module 38 may automatically adjust throttle 26 and/or exhaust restrictor valve 37 to $TN_2$ and/or $ERV_2$, respectively. Control module 38 may notify the operator of the change via display 39 and request acknowledgment via console 44. A second incremental load increase may be associated with $\theta_2$ and $\tau_2$. For example, $\theta_2$ may range from about 65-45% of an effective soot load (e.g., 55.6%) and $\tau_2$ may range from about 120-240 seconds (e.g., 180 seconds). If either $\theta_2$ or $\tau_2$ is achieved, control module 38 may proceed to the next step.

Control module 38 may instruct the operator to select $TN_3$ via throttle selector 42 and/or $ERV_3$ via console 44 (Step 406). Alternatively, control module 38 may automatically adjust throttle 26 and/or exhaust restrictor valve 37 to $TN_3$ and/or $ERV_3$, respectively. Control module 38 may notify the operator of the change and request acknowledgment via display 39. A third incremental load increase may be associated with $\theta_3$ and $\tau_3$. For example, $\theta_3$ may range from about 45-25% of an effective soot load (e.g., 33.3%) and $\tau_3$ may range from about 240-360 seconds (e.g., 300 seconds). If either $\theta_3$ or $\tau_3$ is achieved, control module 38 may proceed to the next step.

Control module 38 may determine if the timer value $\tau_3$ set in the previous step was reached before the target soot load $\theta_3$ set in the previous step was reached (Step 408). If not, DPF 32 may be sufficiently regenerated and control module 38 may instruct the operator to select an idle throttle notch $TN_{idle}$ via throttle selector 42 and/or adjust exhaust restrictor valve 37 to an open position ERVO via console 44 (Step 428). Alternatively, control module 38 may automatically adjust throttle 26 and/or exhaust restrictor valve 37 to $TN_{idle}$ and/or ERVO, respectively. Control module 38 may notify the operator of the change via display 39 and request acknowledgment via console 44, respectively. However, if the elapsed time limit $\tau_3$ was reached before the target soot load $\theta_3$ was reached, control module 38 may proceed to the next step.

Control module 38 may instruct the operator to select $TN_4$ via throttle selector 42 and/or $ERV_4$ via console 44. Alternatively, control module 38 may automatically adjust throttle 26 and/or exhaust restrictor valve 37 to $TN_4$ and/or $ERV_4$, respectively. Control module 38 may notify the operator of the change via display 39 and request acknowledgment via console 44. A fourth incremental load increase may be associated with $\theta_4$ and $\tau_4$. For example, $\theta_4$ may range from about 35-15% of an effective soot load (e.g., 25%) and $\tau_4$ may range from about 240-360 seconds (e.g. 300 seconds). If either $\theta_4$ or $\tau_4$ is achieved, control module 38 may proceed to the next step.

Control module 38 may determine if the elapsed time limit $\tau_4$ set in the previous step was reached before the target soot load $\theta_4$ set in the previous step was reached. If not, DPF 32 may be sufficiently regenerated and control module 38 may proceed to step 428. However, if the elapsed time limit $\tau_4$ was reached before the target soot load $\theta_4$ was reached, control module 38 may proceed to the next step.

Steps 414-426 may continue according to the same general pattern of steps 406-412 above. At steps 414, 418, 422, and 426, control module 38 may instruct the operator to select $TN_5$-$TN_8$, respectively, via throttle selector 42 and/or $ERV_5$-$ERV_8$, respectively, via console 44. Alternatively, control module 38 may automatically adjust throttle 26 and/or exhaust restrictor valve 37 to $TN_5$-$TN_8$, respectively, and/or $ERV_5$-$ERV_8$, respectively. Control module 38 may notify the operator of the change via display 39 and request acknowledgment via console 44. The fifth through eighth incremental load increases may be associated with $\theta_5$-$\theta_8$ and $\tau_5$-$\tau_8$, respectively. However, $\theta_5$-$\theta_8$ may be the same for the remaining incremental load increases and may, for example, range from about 15-5% of an effective soot load (e.g., 11.1%). Similarly, $\tau_5$-$\tau_8$ may be the same for the remaining incremental load increases and may, for example, range from about 240-360 seconds (e.g., 300 seconds). If either $\theta_5$-$\theta_8$ or $\tau_5$-$\tau_8$ is achieved, control module 38 proceeds to the next step.

At steps 416, 420, and 424, control module 38 may determine if the elapsed time limit $\tau$ of the previous step was reached before the target soot load $\theta$ of the previous step was reached. If not, DPF 32 may be sufficiently regenerated and control module 38 may proceed to step 428. However, if the elapsed time limit $\tau$ was reached before the target soot load $\theta$ was reached, control module 38 may proceed to the next step.

If control module 38 reaches step 426, upon reaching $\tau_8$ or $\theta_8$, control module 38 may proceed to step 428. At step 428, control module 38 may instruct the operator to select an idle throttle notch $TN_{idle}$ via throttle selector 42 and/or adjust exhaust restrictor valve 37 to an open position ERVO via console 44. Alternatively, control module 38 may automatically adjust throttle 26 and/or exhaust restrictor valve 37 to $TN_{idle}$ and/or ERVO, respectively. Control module 38 may notify the operator of the change via display 39 and request acknowledgment via console 44. Upon completion of step 428, incremental load sequence 400 may be complete and control module 38 may exit step 312 of the regeneration management process (referring to FIG. 3) and proceed to step 314, as discussed above.

As discussed, the disclosed exhaust system may consider important operating conditions of engine 12 and exhaust system 18 prior to and/or during regeneration of DPF 32 and is an improvement over known exhaust systems. Particularly, exhaust system 18 may include control module 38, which may account for ash content separately from soot content within the particulate filter in determining the soot load within DPF 32. In this way, control module 38 may lead to more accurate triggering and/or termination of regeneration. Further, control module 38 may carry out a regeneration management process for automatically adjusting or instructing an operator to manually adjust throttle notch and exhaust restrictor valve settings to increase the load on engine 12 during regeneration. In this way, control module 38 may gradually increase the temperature within DPF to prevent overheating. The regeneration management process used in conjunction with control module 38 may also improve efficiency by ending the regeneration process once a target soot load is achieved.

It will be apparent to those skilled in the art that various modifications and variations can be made to the disclosed exhaust system. Other embodiments will be apparent to those skilled in the art from consideration of the specification and practice of the disclosed exhaust system. It is intended that the specification and examples be considered as exemplary only, with a true scope being indicated by the following claims and their equivalents.

What is claimed is:

1. An exhaust system for an engine having a throttle, comprising:
   an exhaust passage connectable to the engine; a particulate filter disposed in the exhaust passage;
   a sensor configured to generate a signal indicative of a total pressure differential across the particulate filter caused by soot and ash accumulation;
   a load actuator configured to selectively adjust a load on the engine; and
   a control module electronically connected to the load actuator and the sensor, wherein the control module is configured to:

determine a compensated pressure differential indicative of an amount of the total pressure differential caused by soot accumulation;
determine a soot load of the particulate filter based on the compensated pressure differential;
cause the load actuator to initiate a first engine load increase based on the soot load;
track a time elapsed since initiation of the first engine load increase; and
cause the load actuator to initiate a subsequent engine load increase when the time elapsed is greater than an elapsed time limit and the soot load is greater than a target soot load,
wherein the control module is configured to determine the compensated pressure differential based on a total exhaust flow rate through the exhaust system, an average load factor since a previous particulate filter replacement, and an amount of time elapsed since a previous particulate filter replacement.

2. The exhaust system of claim 1, wherein the control module is configured to cause the load actuator to incrementally increase the load on the engine.

3. The exhaust system of claim 1, wherein the elapsed time limit is about 180 to 300 seconds.

4. The exhaust system of claim 1, wherein the control module is configured to determine one of a mass flow-based soot load and an idle time-based soot load based on the compensated pressure differential.

5. The exhaust system of claim 4, wherein the control module is configured to determine the idle time-based soot load when the compensated pressure differential is below a threshold value.

6. The exhaust system of claim 5, wherein the control module is configured to determine the mass flow-based soot load when the compensated pressure differential is equal to or greater than the threshold value.

7. The exhaust system of claim 1, further including a display, wherein:
the load actuator includes one or more of a throttle and an exhaust restrictor valve; and
the control module is electronically connected to the display and is further configured to show instructions on the display requesting an operator selection of one or more of the throttle and the exhaust restrictor valve for use in increasing the load on the engine.

8. The exhaust system of claim 7, wherein the control module is further configured to show on the display instructions for an operator to manually adjust one or more of the throttle and the exhaust restrictor valve to increase the load on the engine when manual mode is selected.

9. The exhaust system of claim 7, wherein the control module is configured to show on the display instructions requesting an operator selection of manual or automatic management of one or more of the throttle and the exhaust restrictor valve.

10. The exhaust system of claim 9, wherein the control module is further configured to automatically adjust one or more of the throttle and the exhaust restrictor valve to increase the load on the engine when automatic management is selected by an operator.

11. A method of regenerating a particulate filter in an exhaust system of an engine, comprising:
determining a total pressure differential across the particulate filter caused by soot and ash accumulation;
determining a compensated pressure differential indicative of aa amount of the total pressure differential caused by soot accumulation;
determining a soot load of the particulate filter based on the compensated pressure differential;
requesting an operator selection of manual or automatic regeneration of the particulate filter; and
selectively initiating a first incremental engine load increase according to the operator selection;
tracking a time elapsed since initiation of the first incremental engine load increase;
comparing the soot load of the particulate tilter to a first target soot load; and
selectively initiating a subsequent incremental engine load increase when the time elapsed is greater than an elapsed time limit and the soot load is greater than a target soot load,
wherein determining the compensated pressure differential includes:
determining an average load factor since a previous particulate filter replacement;
tracking a time elapsed since a previous particulate filter replacement;
determine an ash load pressure differential by multiplying the average load factor by the time elapsed.

12. The method of claim 11, further including requesting an operator selection of one or more load actuators for use in increasing a load on the engine.

13. The method of claim 11, wherein the subsequent incremental load increase corresponds to a target soot load and an elapsed time limit.

14. The method of claim 11, wherein the elapsed time limit is about 180 to 300 seconds.

15. The method of claim 11, wherein determining the soot load includes determining one of a mass flow-based soot load and an idle time-based soot load based on the compensated pressure differential.

16. The method of claim 15, wherein determining the soot load includes determining the idle time-based soot load when the compensated pressure differential is below a threshold value.

17. The method of claim 15, wherein determining the soot load includes determining the mass flow-based soot load when the compensated pressure differential is equal to or greater than a threshold value.

18. A locomotive comprising:
an engine having a throttle;
an operator station having a console and a throttle selector connected to the throttle;
a particulate filter fluidly connected to receive exhaust from the engine;
a sensor configured to generate a signal indicative of a total pressure differential across the particulate filter caused by soot and ash;
a load actuator configured to selectively adjust a load on the engine;
a control module electronically connected to the load actuator and the sensor, wherein the control module is configured to:
determine a compensated pressure differential indicative of an amount of the total pressure differential caused by soot accumulation;
determine an idle time-based soot load of the particulate filter when the compensated pressure differential is below a threshold;
determine a mass flow-based soot load of the particulate filter when the compensated pressure differential is equal to or greater than the threshold;

determine a final soot load based on one of the idle time-based soot load and the mass flow-based soot load;

cause the load actuator to initiate a first incremental engine load increase based on one of the idle time-based soot load and the mass flow-based soot load;

track a time elapsed since initiation of the first incremental engine load increase and compare the final soot load to a first target soot load;

cause the load actuator to initiate a subsequent engine load increase when the time, elapsed is greater than elapsed time limit and the final soot load is greater than a target soot load.

* * * * *